F. A. FAIRBAIRN.
VANITY CASE.
APPLICATION FILED FEB. 2, 1920. RENEWED MAR. 31, 1921.

1,391,050.

Patented Sept. 20, 1921.

Inventor
Francis A. Fairbairn
By Fetherstonhaugh & Co
Attys.

UNITED STATES PATENT OFFICE.

FRANCIS A. FAIRBAIRN, OF MONTREAL, QUEBEC, CANADA, ASSIGNOR TO PALMERS LIMITED, OF MONTREAL, QUEBEC, CANADA.

VANITY-CASE.

1,391,050. Specification of Letters Patent. Patented Sept. 20, 1921.

Application filed February 2, 1920, Serial No. 355,675. Renewed March 31, 1921. Serial No. 457,422.

*To all whom it may concern:*

Be it known that I, FRANCIS A. FAIRBAIRN, a subject of the King of Great Britain, and resident of the city of Montreal, in the Province of Quebec and Dominion of Canada, have invented certain new and useful Improvements in Vanity-Cases, of which the following is a full, clear, and exact description.

This invention relates to improvements in vanity cases, and the object of the invention is to provide a vanity case which may be very easily opened for use.

A further object is to provide a case which may be very easily and quickly refilled when empty.

The device consists briefly of a box of suitable shape having a hingedly connected cover and containing a releasably mounted cosmetic receptacle.

In the drawings which illustrate the invention:—

Figure 1:
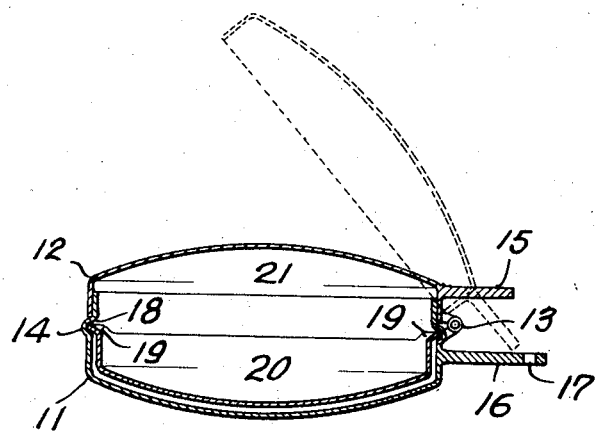
Figure 1 is a sectional view of the device.
Figure 2:
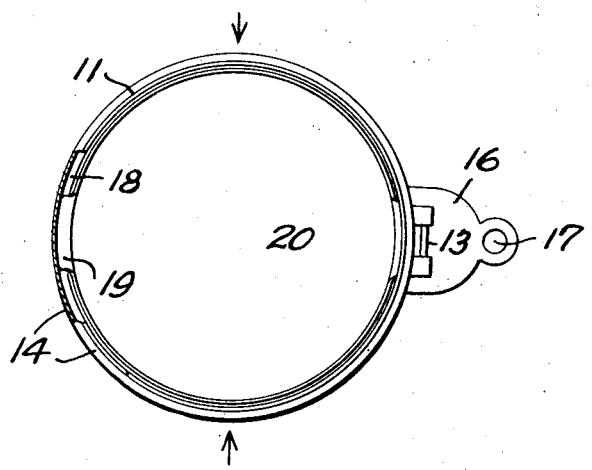
Fig. 2 is a plan view thereof.

Referring more particularly to the drawings, 11 designates a box body of suitable shape having a cover 12 connected to the body by a hinge 13. The cover is flanged and preferably overlaps the body and closes against an external rib 14 on the body which forms a stop. The cover and box body are provided with short arms 15 and 16 respectively located above and below the hinge 13 and arranged approximately in parallelism when the box is closed. The arm 16 connected to the box body may be provided with an opening 17 for the attachment of a chain or ribbon to suspend the device from the wearer's neck. The case may be opened by pressing the arms 15 and 16 together, as is clearly indicated in Fig. 1.

The box body is provided with an internal circumferential groove 18, in which the outwardly projecting oppositely disposed ears 19 of a cosmetic pan 20 may engage to support the pan in the box body and hold it against accidental removal. When it is desired to remove an empty pan 20 for the insertion of a full one, the body is pinched at opposite points midway between the ears 19, so as to elongate the body and free the ears 19 from the groove 18. The empty pan 20 may then be lifted or shaken out and a new full pan pressed into place. The space 21 between the top of the pan and the cover will serve for the reception of an instrument for applying the cosmetic in the pan and possibly for a small mirror. In the construction shown in Fig. 1, the cover stop 14 is produced by displacing the material of the body to produce the groove 18, but it will be understood that the invention is not limited to this particular feature nor to a groove extending entirely around the box, as diametrically opposite portions of the groove of sufficient extent to receive the pan ears are all that are really required. It will also be understood that the invention is not limited to the circular shape shown.

Having thus described my invention, what I claim is:—

1. In a device of the class described, a receptacle having an internal groove, a removable pan within the receptacle, having outwardly projecting ears to engage the groove and hold the pan within the receptacle, said receptacle being compressible to effect releasement of the ears from the groove and permit removal of the pan.

2. In combination with a device according to claim 1, a cover reinforcing said receptacle and holding the same against flexion sufficient to release the pan.

In witness whereof, I have hereunto set my hand.

FRANCIS A. FAIRBAIRN.